United States Patent
Ueno (10) Patent No.: US 7,574,324 B2
(45) Date of Patent: Aug. 11, 2009

(54) ABNORMALITY DIAGNOSTIC METHOD AND DEVICE THEREOF

(75) Inventor: Hiroshi Ueno, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 11/867,843

(22) Filed: Oct. 5, 2007

(65) Prior Publication Data

US 2008/0091383 A1 Apr. 17, 2008

(30) Foreign Application Priority Data

Oct. 12, 2006 (JP) ............................. 2006-279000

(51) Int. Cl.
G06F 11/30 (2006.01)
G21C 17/00 (2006.01)

(52) U.S. Cl. ....................................................... 702/185

(58) Field of Classification Search .................. 702/58, 702/183–185, 59; 324/500, 511; 714/40, 714/41

See application file for complete search history.

(56) References Cited

U.S. PATENT DOCUMENTS

2008/0039973 A1* 2/2008 Ueno et al. ................. 700/245
2008/0140258 A1* 6/2008 Ueno et al. ................. 700/260
2008/0215292 A1* 9/2008 Kato et al. .................. 702/183
2008/0243434 A1* 10/2008 Boutin ........................ 702/179

FOREIGN PATENT DOCUMENTS

JP 2000-250625 A1 9/2000

* cited by examiner

Primary Examiner—Michael P Nghiem (57) ABSTRACT

An abnormality diagnostic device selects a previously stored diagnostic measuring orbit (S110), and makes a machine to perform a specified operation for diagnosis so as to measure a driving power value of an actuator (S120). In S140, the abnormality diagnostic device compares the measured driving power value and a driving power value at the time of normal driving, and extracts a non-corresponding portion as a characteristic point based on a previously set determination criteria. When the extracting of the characteristic point is confirmed in S170, the abnormality diagnostic device compares the extracted characteristic point with a characteristic point predicted to occur in a driving power value at a time of occurring abnormality in a mechanism element, and calculates an evaluation index from a corresponding degree of both. When the evaluation index is a threshold value or more in S180, the abnormality diagnostic device estimates a mechanism element having an abnormality in S190.

5 Claims, 5 Drawing Sheets

FIG.5D $t'_1$ $t'_2$ $t'_3$

ABNORMALITY DIAGNOSTIC METHOD AND DEVICE THEREOF

BACKGROUND OF THE INVENTION

This application claims the benefit of Japanese Patent Application Number 2006-279000 filed on Oct. 12, 2006, the entirety of which is incorporated by reference.

FIELD OF THE INVENTION

The present invention relates to an abnormality diagnostic method to diagnose abnormality in a machine tool which has an actuator and detection means to detect operation data of the actuator, and a device thereof.

DESCRIPTION OF THE BACKGROUND ART

A driving state of a machine tool having an actuator has been usually diagnosed by being sensed an abnormal state, or measuring of an operation state of a machine and analyzing of a measured result. The abnormal state is found by an abnormal stop or abnormal sounds of a machine or abnormal load of an actuator which was measured. The measuring of the operation state of the machine is conducted by a measuring apparatus.

In the above mentioned method, at the time when the abnormality is diagnosed by the abnormal stop and the abnormal sounds, the abnormal state might already advance to a serious level. Further, when the abnormality is diagnosed by monitoring of abnormal load of the actuator, it is hard to set an evaluation criteria of a threshold value, since load at a normal state is varied depending on the operation content of a machine. Further, when the abnormality is diagnosed by using of a measured result by a measuring apparatus, it takes time and labor, and further a processing line should be stopped. Thus, the diagnosing cannot be frequently carried out, and abnormality cannot be revealed within a short time after the abnormality occurs. Furthermore, since these methods need a procedure to specify a place where abnormality occurs before repairing, measuring and analyzing become more necessary, and thus a downtime of a machine may be extended.

On the other hand, Patent Document 1 discloses a following method instead of the above-described methods, that is, the method including a step of previously storing normal operation time and driving powder value of an actuator in storage means, a step of comparing detected operation time or driving power value with the normal operation time or driving power value, a step of determining whether a trouble is heavy or light based on the difference between the both values, and a step of display a warning.

[Patent Document 1] Unexamined Japanese Patent Publication No. 2000-250625

SUMMARY OF THE INVENTION

The method disclosed in Patent Document 1 is useful when an operation system has a single mechanism element. However, when an operation system has a plurality of mechanism elements, the method cannot specify which mechanism element has an abnormality, and thus, an additional diagnosing must be conducted. Particularly, when a diagnosis object is a parallel mechanism machine tool in which a mechanism constitutes a closed loop, occurrence of abnormality at a certain mechanism element may influence on the other mechanism elements, such as a drive spindle. Thus, it cannot be always said that an abnormality occurs in a mechanism element which is different from the normal state.

An object of the present invention is to provide an abnormality diagnostic method capable of determining the existence of an abnormality, specifying a mechanism element, and accurately carrying out abnormality diagnosing at an early stage even when a machine includes a mechanism element having a plurality of operation systems, and another object is to provide a device of the method.

In order to achieve the above-described object, a first aspect of the present invention is a6n abnormality diagnostic method for diagnosing an abnormality in which a machine is made to carry out a previously set operation for diagnosis. The machine includes an actuator and detection means to detect operation data of the actuator and the method includes four steps. The first step is to make a machine to carry out an operation for diagnosis at a time of diagnosing, compare operation data obtained by the detection means with operation data at a time of normal driving which was obtained by a previous operation for diagnosis at the time of normal driving, and extract a non-corresponding portion as a characteristic point. The second step is to determine an existence of abnormality of the machine depending on an existence of the characteristic point extracted in the first step. The third step is to compare the characteristic point extracted in the first step with a characteristic point predicted in the operation data at the time of abnormality occurrence anticipated in a mechanism element constituting an operation system of the machine, and determine the corresponding degree of both when the second step determines that an abnormality exists in the machine. The fourth step is to estimate a mechanism element which has an abnormality based on the corresponding degree determined in the third step.

Further, a second aspect of the present invention is an abnormality diagnostic device which makes a machine to carry out a previously set operation for diagnosis, and the machine includes an actuator and detection means to detect operation data of the actuator. The abnormality diagnostic device includes characteristic point extracting means to compare operation data at a time of normal driving of the machine with the operation data obtained by the detection means at the time of diagnosing the machine, and to extract a non-corresponding portion as a characteristic point. The operation data at the time of normal driving is obtained by the detection means when the machine is made to carry out an operation for diagnosis at the time of normal driving. Further, the abnormality diagnostic device includes state diagnosis means to determine an occurrence of an abnormality of the machine based on an existence of the characteristic point extracted in the characteristic point extracting means. Further, the abnormality diagnostic device includes abnormal-time characteristic point storage means to storage a characteristic point predicted to occur in the operation data at the time of occurring an abnormality anticipated in a mechanism element constituting an operation system of the machine. Furthermore, the abnormality diagnostic device includes abnormal portion estimating means to compare the characteristic point extracted by the characteristic point extracting means with the characteristic point stored by the abnormal-time characteristic point storage means, and estimate a mechanism element having an abnormality based on the corresponding degree of both.

A third aspect of the present invention is an abnormality diagnostic device in which the characteristic point extracting means in the second aspect is to measure a difference waveform between the operation data at the time of normal driving and the operation data at the time of diagnosing, and extract a portion meeting a condition previously specified as an index of an abnormal state in the measured waveform as a characteristic point.

A fourth aspect of the present invention is an abnormality diagnostic device in which the abnormal-time characteristic point storage means in the second and the third aspect is to store a characteristic point extracted from operation data measured at the time of actual occurrence of an abnormality in each mechanism element.

The present invention is capable of determining an existence of an abnormality of a machine and estimating a mechanism element having the abnormality by making the machine to carry out an operation for diagnosis with arbitrary timing. Thus, the present invention can accurately and certainly carry out an abnormality diagnosis to a diagnostic object which has a mechanism constituting a closed loop, e.g., a parallel mechanism machine tool, at an early stage.

BRIEF DESCRIPTION OF THE DRAWINGS

FIG. 5 including following four diagrams.

DETAILED DESCIPTION OF THE INVENTION

Embodiments of the present invention will be described below referring to the drawings.

Figure 1:
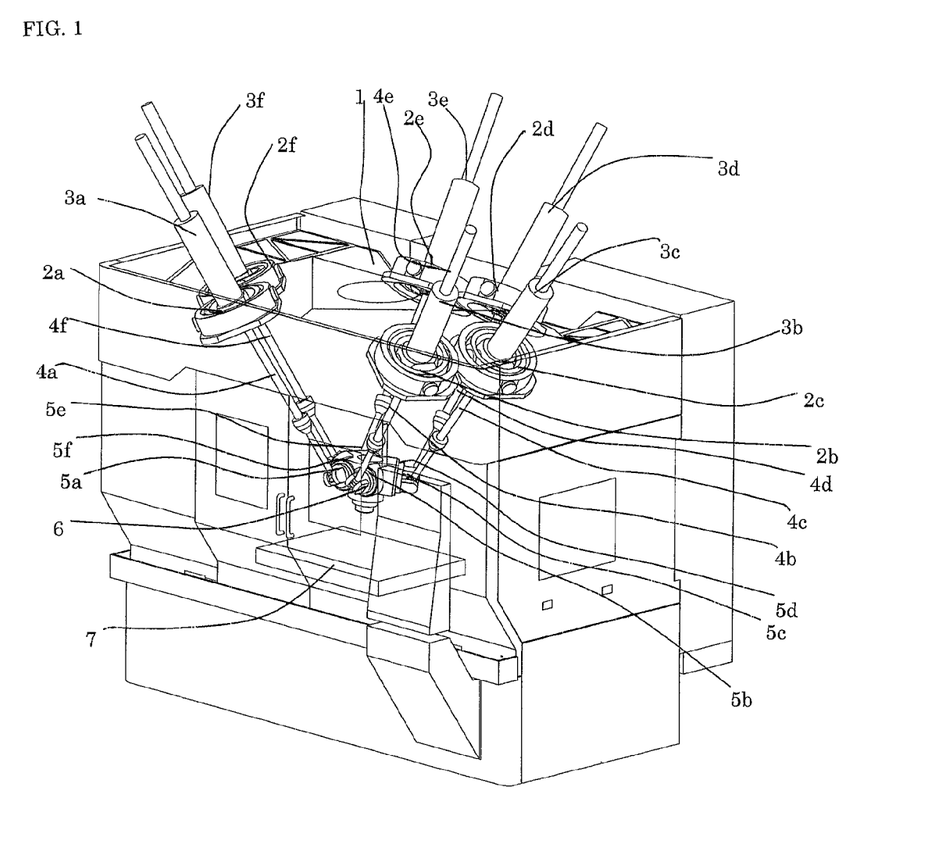
FIG. 1 is a perspective view of a parallel mechanism machine tool on which an abnormality diagnostic device is mounted.

FIG. 1 is a perspective view to illustrate an example of a parallel mechanism machine on which an abnormality diagnostic device of the present invention is mounted, where a part of the machine is seen through so as to easily understand an inside of the machine. The parallel mechanism machine is a Stewart platform type parallel mechanism machine tool having six degree-of-freedom. A frame 1 has servo motors 3a to 3f as an actuator which has an encoder through six first universal joints 2a to 2f. The servo motors 3a to 3f respectively have ball screws 4a to 4f, and lower ends of the ball screws 4a to 4f have an end effector 6 having a cutter fitting part and a cutter rotating mechanism through six second universal joints 5a to 5f. A table 7 is to set a work.

Figure 2:
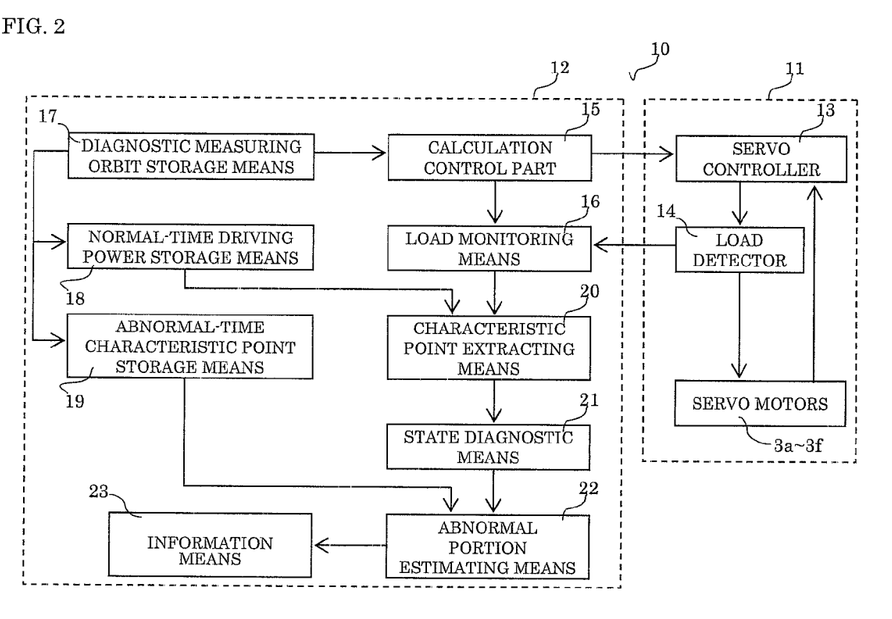
FIG. 2 is a schematic constitutional view of an abnormality diagnostic device.

FIG. 2 is a block diagram to illustrate a summary of the abnormality diagnostic device. An abnormality diagnostic device 10 includes a structure part provided at an operation system 11 of the parallel mechanism machine tool, and a structure part provided at a NC machine 12. The operation system 11 includes servo motor controller 13 to supply a load current to the servo motors 3a to 3f based on a supplying instruction outputted from a calculation control part 15 of the NC machine 12. The load current value is detected as a driving power value by a load detector 14, and stored in load monitoring means 16 of the NC machine 12. The load monitoring means 16 acquires driving power values of the servo motors 3a to 3f from the load detector 14, and stores the values as time serial data.

In the NC machine 12, the calculation control part 15 acquires orbital data for measuring from diagnostic measuring orbit storage means 17, calculates instructions to operate the ball screws 4a to 4f, transmits the instructions to the servo controller 13, and makes a machine to carry out a predetermined operation for diagnosis. The diagnostic measuring orbit storage means 17 being diagnostic operation storage means stores previously determined data of a diagnostic measuring orbit, and transmits the data of a diagnostic orbit for measuring according to an instruction from the calculation control part 15.

Further, load data at a normal operation is stored in normal-time driving power value storage means 18 for every data of the diagnostic orbit stored in the diagnostic measuring orbit storage means 17. On the other hand, a distribution of a characteristic point (a predicted characteristic point) of load data is stored in abnormal-time characteristic point storage means 19. The characteristic point of the load data is predicted to occur at the time of an abnormality in a mechanism element such as a ball screw.

Characteristic point extracting means 20 measures the difference between load data in the diagnostic orbit stored by the load monitoring means 16 and load data at the normal operation in the diagnostic orbit stored by the normal-time driving power value storage means 18, and extracts a characteristic point indicating an abnormal state of a driving power value. State diagnostic means 21 monitors the extracted number of detected characteristic points extracted in each measuring orbit by the characteristic point extracting means 20. When the extracted number of the characteristic point at a time of finishing measuring is 0, the state diagnostic means 21 determines that a machine state is normal, and finishes diagnostic processing.

Further, abnormal portion estimating means 22 compares a detected characteristic point extracted through the state diagnostic means 21 and a predicted characteristic point corresponding to an abnormality of each mechanism element stored by the abnormal-time characteristic point storage means 19, and estimates an abnormal mechanism element corresponding to the detected characteristic point.

In addition, a single or a plurality of the diagnostic measuring orbits stored in the diagnostic measuring orbit storage means 17 is previously set. The NC machine 12 structured as described above evaluates each mechanism element of the whole diagnostic orbits by the above-described each means, and displays a warning of mechanism elements listed as candidates to cause abnormality by information means 23.

A flowchart of an abnormality diagnostic method by the abnormality diagnostic device 10 as described above will be described referring to FIGS. 3 and 4.

Figure 3:
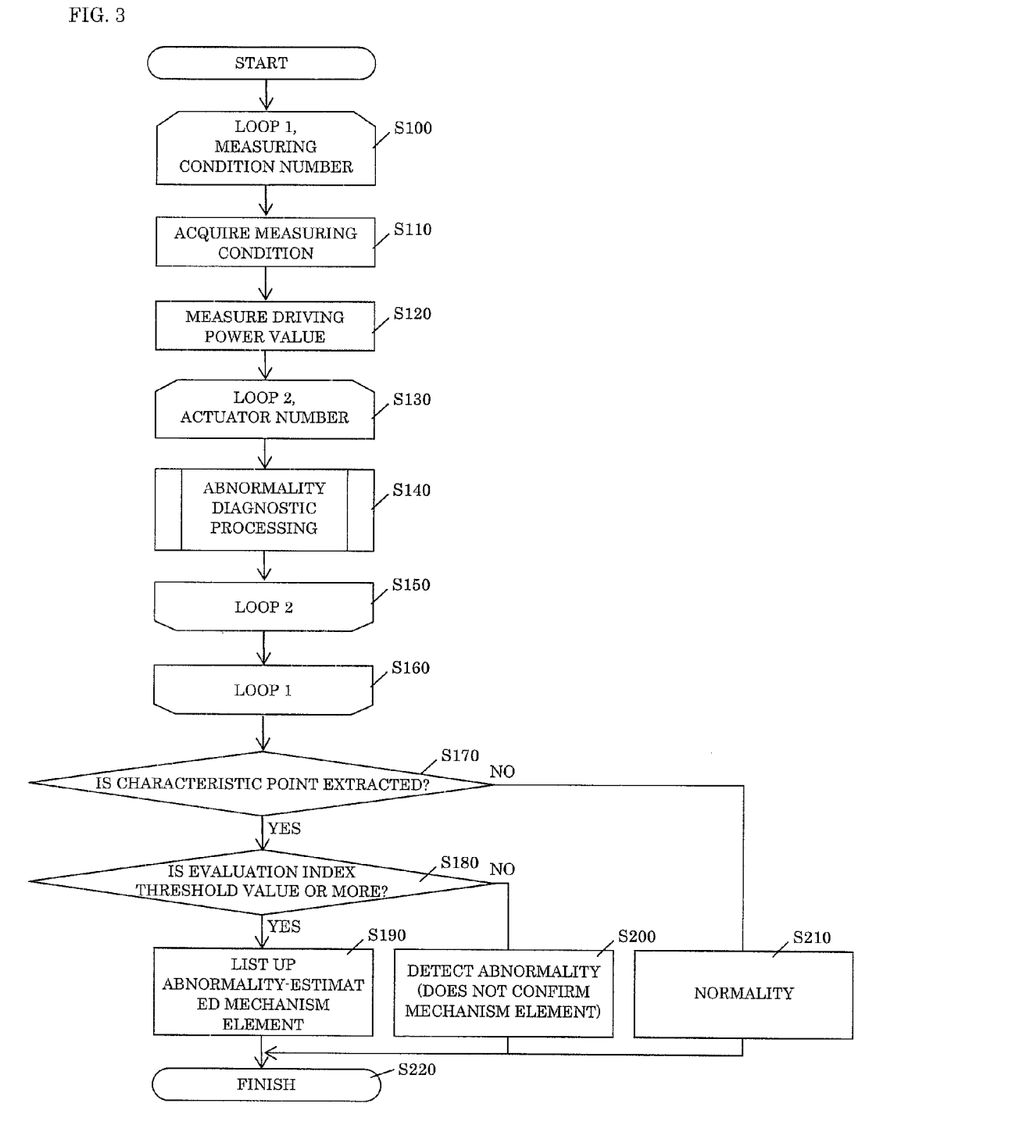
FIG. 3 is a flowchart of an abnormality diagnostic method.
Figure 4:
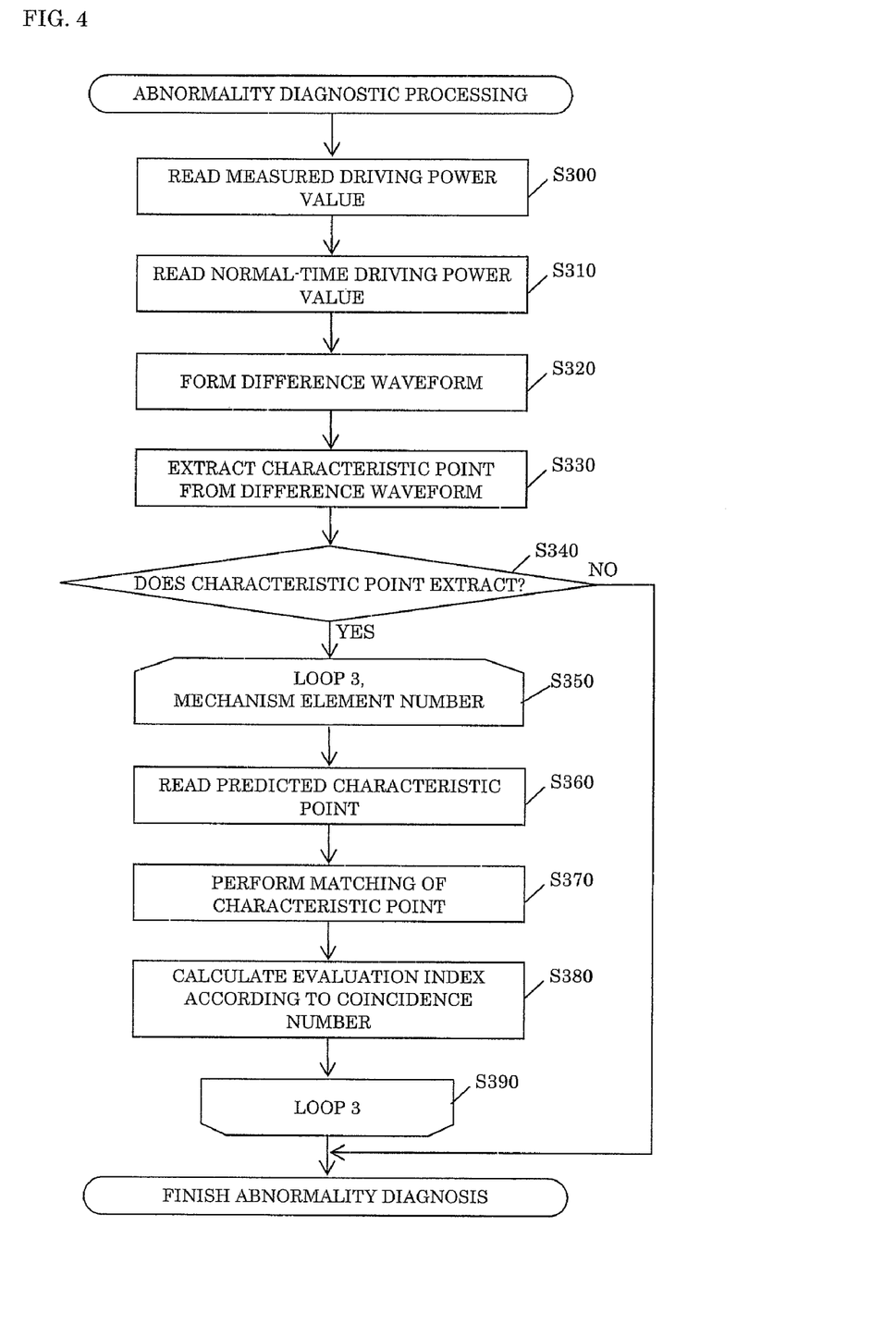
FIG. 4 is a flowchart of an abnormality diagnostic method.

FIG. 3 illustrates a series of a flow from measuring a diagnosis to estimating an abnormal portion. FIG. 4 illustrates extracting of a characteristic point from a measured waveform and matching the characteristic point with a predicted characteristic point in the flow in FIG. 3.

Firstly, in FIG. 3, the abnormal diagnostic device 10 carry outs a loop 1 from steps (it will be called as just "S" below) 100 to 160 by the number of the set diagnostic measuring orbits (the measuring condition numbers). In S110, the abnormal diagnostic device 10 acquires a measuring condition. That is, the abnormal diagnostic device 10 selects measuring orbit data from the diagnostic measuring orbit storage means 17. Then, in S120, the abnormal diagnostic device 10 operates a parallel mechanism machine tool based on the selected diagnostic orbit data, acquires driving power values of the servo motors 3*a* to 3*f* from the load detector 14, and stores them in the load monitoring means 16.

Then, the abnormal diagnostic device 10 carry out a loop 2 from S130 to S150 by only the number of the servo motors 3*a* to 3*f*. In the loop 2, the abnormal diagnostic device 10 compares the driving power values of each of the servo motors 3*a* to 3*f* in the measuring orbits with driving power values in the same orbits, which are previously measured at the time of normally operating a machine and stored in the normal-time driving power value storage means 18, and carry outs abnormality diagnostic processing which extracts a characteristic point and performs matching. Detailed description of the abnormality diagnostic processing is illustrates in FIG. 4.

The abnormal diagnostic device 10 reads-in the driving power values of the servo motors 3*a* to 3*f* measured in S120 and the driving power values at a normally operation, which are previously stored (S300 and 310). The characteristic point extracting means 20 measures the difference waveform between both (S320). Then, the abnormal diagnostic device 10 calculates a parameter of the difference waveform, which is previously determined as a determination index of an abnormal state, and extracts a portion which has a value more than a criteria value as a characteristic point. Here, although the parameter determined as a determination index depends on an abnormal state of a predicted mechanism element, the abnormal diagnostic device 10 extracts an extreme value of the difference waveform as a characteristic point in the present embodiment. Accordingly, the abnormal diagnostic device 10 measures an extreme value of the difference waveform and extracts a portion being more than a threshold value as a characteristic point (S330).

When extracting of a characteristic point is not confirmed by a determination in S340, the state diagnostic means 21 determines that an abnormality does not exist in the driving power value waveform of each of the servo motors 3*a* to 3*f* in the measuring orbits, and skips the processing of matching characteristic points so as to finish an abnormality diagnosing.

When the characteristic point is extracted, the abnormal portion estimating means 22 carry out a loop 3 from S350 to S390 by the number of mechanism elements for the abnormality measuring.

Firstly, in S360, as for each of the servo motors 3*a* to 3*f* in the measuring orbits, the abnormal diagnostic device 10 reads-in a distribution of a predicted characteristic point of the mechanism element from the abnormal-time characteristic point storage means 19. Then, in S370, the abnormal diagnostic device 10 compares the characteristic point distribution read in S360 with the detected characteristic point extracted in S330. When both are determined to correspond each other, the abnormal diagnostic device 10 recalculates a corresponding degree evaluation index of the mechanism element in S380.

After carrying out the loops 1 to 3 by the specified number, the abnormal diagnostic device 10 determines a machine state to be normal when the characteristic point is not detected in all diagnostic orbits in extracting processing of a detected characteristic point and a machine diagnosing is finished (S170 and 210).

On the other hand, when the characteristic point is detected, the abnormal diagnostic device 10 determines that some abnormalities occur, and estimates an abnormality element by using a characteristic point corresponding degree evaluation index of each mechanism element. Here, when the evaluation index of any mechanism elements does not exceed a previously set threshold value, the abnormal diagnostic device 10 determines that information used for estimating an abnormal portion is little, an abnormal portion is not estimated, and a warning of only an abnormality occurrence Is displayed(S180 and 200). However, when the evaluation index of one of mechanism elements exceeds the threshold value, the abnormal diagnostic device 10 displays a warning that abnormality occurrence is estimated about mechanism elements which have values exceeding the threshold value (S190).

In addition, a calculating method of the evaluation index may be arbitrarily set. When it is predicted that a difference arises about an easiness of appearance of influence to a driving power by the abnormality of mechanism element according to kinds of the measuring orbit, the evaluation index can be weighted so as to cope with the difference.

An abnormality diagnosis by the abnormality diagnostic device 10 will be described below with Examples.

Figure 5A:
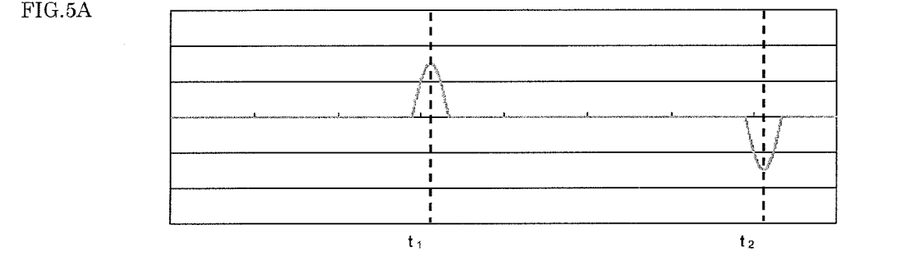
FIG. 5(A) illustrates one example of a predicted characteristic point in Examples.

When abnormality occurs at a rotation spindle of any one of the first universal joints 2*a* to 2*f*, which remarkably increases rotation friction, an operation of the end effector 6 is temporarily inhibited at the time of reversely rotating the rotation spindle, and thus the load of each of the servo motors 3*a* to 3*f* increases. At this time, the load of each of the servo motors 3*a* to 3*f* is predicted that it has a projected waveform having extreme values near rotation spindle reversing times $t_1$ and $t_2$ as illustrated in FIG. 5(A). Thus, the abnormal-time characteristic point storage means 19 stores the times $t_1$ and $t_2$ as a predicted characteristic point.

The above operation is carried out to set on each mechanism element according to a predicted abnormal case. In addition, this operation must be done only one time at a time of setting the diagnosing measuring orbit and is not necessary to set at each measuring time.

When diagnosing is carried out, a characteristic point in a waveform of a measured driving power value is extracted as follows.

Figure 5B:
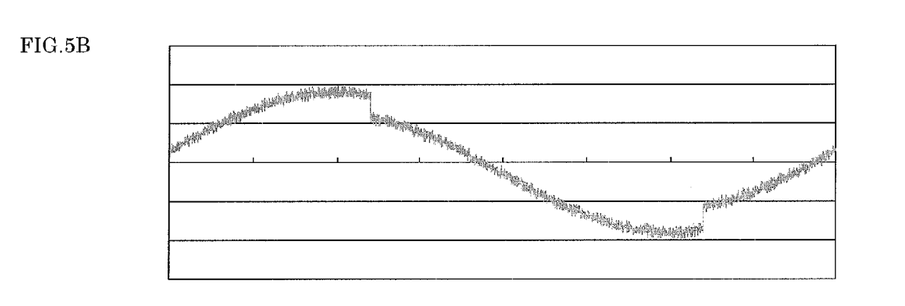
FIG. 5(B) illustrates one example of a waveform of a driving power value at a normal operation in Examples.
Figure 5C:
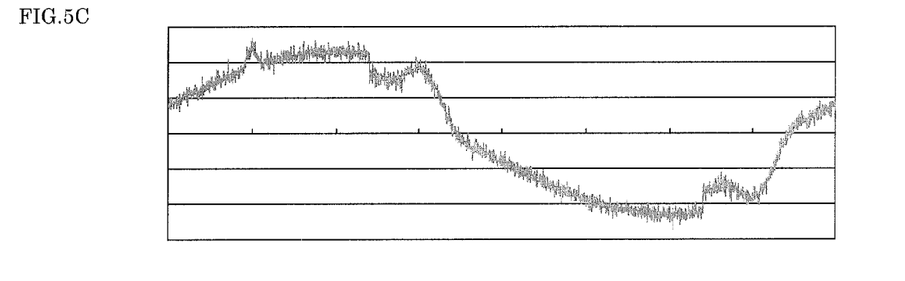
FIG. 5(C) illustrates one example of a waveform of a driving power value at an abnormal operation in Examples.
Figure 5D:
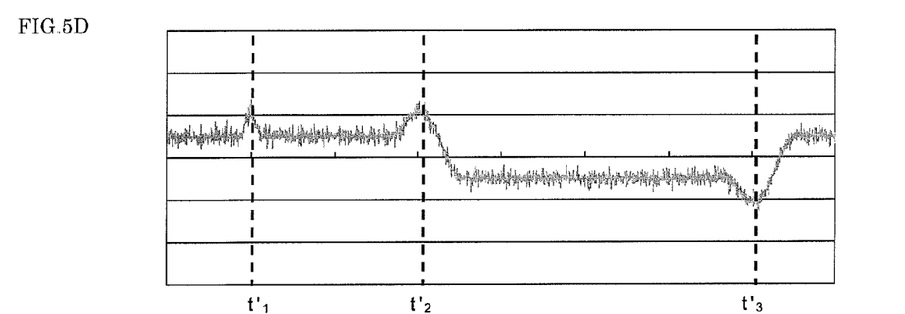
FIG. 5(D) illustrates an example of extracting a characteristic point from the waveform difference in Examples.

A waveform of a driving power value at the time of normal operation in the measuring orbit i and the servo motor j is illustrated in FIG. 5(B), and a waveform of a driving power value at the time of diagnosing a machine in the same measuring orbit is illustrated in FIG. 5(C). In this case, the difference waveform of driving power values at the time of normal operation and diagnosing the machine is illustrated in FIG. 5(D). The characteristic point extracting means 20 extracts a characteristic point from the difference waveform in FIG. 5(D). At this time, since the measured driving power value includes high frequency elements by an influence of a noise, it is desirable to previously remove high order elements by using a low pass filter.

Accordingly, the difference waveform is calculated so as to obtain a first differentiation and a second differentiation, and times $t_1'$ to $t_3'$ when the difference driving power value reaches to the extreme values are extracted.

In this case, in order to remove the influence from a disturbance, a threshold value can be determined from the extracted extreme value.

Further, the abnormal portion estimating means 22 compares the obtained times $t_1'$ to $t_3'$ with a predicted characteristic point, and obtains the corresponding number. In the present embodiment, the abnormal portion estimating means 22 compares time information of the predicted characteristic point in the driving power value of each measuring orbit with that of the detected characteristic point, and determines that the characteristic points are corresponding each other when a time difference of both are within the set threshold value. When the number of a predicted characteristic point by a mechanism element k in the measuring orbit i and the servo monitor j is $n_{eijk}$ and the number of a corresponding characteristic point is $n_{dijk}$, the corresponding degree evaluation index $V_{ijk}$ can be defined as the following formula 1.

$$V_{ijk} = \frac{n_{dijk}}{n_{eijk}} \qquad \text{[Formula 1]}$$

When $V_{ijk}$ is close to 1, that is, there are many detected characteristic points being corresponding with the predicted characteristic points, a measured waveform of a driving power value in the measuring orbit i and the servo motor j is remarkably influenced by the abnormality of the mechanism element k. Thus, as for all mechanism elements k, the obtained differences of waveform are calculated so as to obtain an influence degree of each mechanism element in the measured waveform of the driving power value.

The above-described process was carried out with respect to all measured driving power values, and then average values of all measuring orbits and all measured driving power values are obtained according to the following formula 2. In the present embodiment, since an element having $V_k$ closing to 1 is estimated as a cause of an abnormality, higher elements are warned as candidates to cause an abnormality by the information means 23.

$$V_k = \frac{1}{l}\frac{1}{m}\sum_{i=1}^{l}\sum_{j=1}^{m} V_{ijk} \qquad \text{[Formula 2]}$$

l: Measuring Orbit Number
m: Servo motor number
$V_1$: Characteristic point corresponding degree in mechanism element k According to the abnormality diagnostic method of the present embodiment and the device thereof, the existence of the abnormality of the machine, and a mechanism element having an abnormality can be estimated by making the machine to perform an operation for diagnosis with arbitrary timing. Accordingly, the method can accurately carry out abnormality diagnosing in an early stage with respect to a diagnostic object which includes a mechanism element structuring a closed loop, e.g., a parallel mechanism machine tool.

In addition, in a series of estimating an abnormal portion, a characteristic point by each mechanism element may be overlapped in a single measuring orbit. Thus, diagnosing can be effectively performed in a plurality of orbits since there is a possibility to decrease an accuracy for estimating an abnormal portion.

Further, a driving power value of a servo motor is detected as operation data in the above-described embodiment. However, the data is not limited to the driving power value, and diagnosing can be performed based on a deviation (a positional deviation value) between a specified position in each actuator and a position detected by a position detector. That is, an abnormality diagnosis can be performed by a similar process to the above-described embodiment by previously storing a positional deviation value which is detected at the time of an operation for diagnosis when a machine is normally driven, and comparing the stored deviation value with a positional deviation value measured at the time of diagnosing so as to extract a characteristic point.

Further, abnormal-time characteristic point storage means can store a characteristic point extracted from operation data such as a driving power value or a positional deviation value, which is measured at the time of actually occurring abnormality in a mechanism element, in addition to a characteristic point predicted to occur in operation data at the time of occurring abnormality in each mechanism element of a machine.

Furthermore, a parallel mechanism machine tool is described as an example of a diagnostic object in the present embodiment. However, the present invention is not limited to the parallel mechanism machine tool, and can be applied to a general operation system driven by an actuator having detection means of operation data such as a driving power value or a positional deviation value.

What is claimed is:

1. An abnormality diagnostic method for diagnosing an abnormality which makes a machine to carry out a previously set operation for diagnosis, wherein the machine comprises an actuator and a detector to detect operation data of the actuator, the method comprising:

a first step to make the machine to carry out the operation for diagnosis at a time of diagnosing, compare operation data obtained by the detector and operation data at the time of normal driving obtained by previously making the machine to carry out the operation for diagnosis at the time of normal driving, and extract a non-corresponding portion as a characteristic point;

a second step to determine an existence of an abnormality of the machine based on the existence of the characteristic point extracted in the first step;

a third step to compare the characteristic point extracted in the first step with a characteristic point predicted to occur in the operation data at the time of occurring an abnormality anticipated in a mechanism element constituting an operation system of the machine, and determine a degree of correspondence between the characteristic point extracted in the first step and the characteristic point predicted to occur in the operation data, when the second step determines that the abnormality of the machine exists; and a fourth step to estimate the mechanism element having the abnormality based on the degree of correspondence determined in the third step.

2. An abnormality diagnostic device for diagnosing an abnormality which makes a machine to carry out a previously set operation for diagnosis, wherein the machine comprises an actuator and a detection mechanism to detect operation data of the actuator, the device comprising:

a characteristic point extracting mechanism for,
  comparing the operation data at a time of normal driving of the machine with the operation data obtained by the detection mechanism at the time of diagnosing the machine, and
  extracting a non-corresponding portion as a characteristic point, wherein the operation data at the time of normally driving is obtained by the detection mechanism when the machine is made to carry out an operation for diagnosis at the time of normally driving;

a state diagnosis mechanism for determining an existence of an abnormality of the machine depending on an existence of the characteristic point extracted in the characteristic point extracting mechanism;

an abnormal-time characteristic point storage mechanism for storing a characteristic point predicted to occur in the operation data at the time of occurring an abnormality anticipated in a machine element constituting an operation system of the machine; and an abnormal portion estimating mechanism for, comparing the characteristic point extracted by the characteristic point extracting mechanism with the characteristic point predicted to occur and stored by the abnormal-time characteristic point storage mechanism, and estimating the machine element having an abnormality based on a degree of correspondence between the characteristic point extracted by the characteristic point extracting mechanism and the characteristic point predicted to occur and stored by the abnormal-time characteristic point storage mechanism, an abnormal-time characteristic point storage mechanism for storing a characteristic point predicted to occur in the operation data at the time of occurring an abnormality anticipated in a machine element constituting an operation system of the machine; and an abnormal portion estimating mechanism for, comparing the characteristic point extracted by the characteristic point extracting mechanism with the characteristic point stored by the abnormal-time characteristic point storage mechanism, and estimating a machine element having an abnormality based on a degree of correspondence between the characteristic point extracted by the characteristic point extracting mechanism and the characteristic point stored by the abnormal-time characteristic point storage mechanism.

3. The abnormality diagnostic device according to claim 2, wherein the characteristic point extracting mechanism is to measure a difference waveform between the operation data at the time of normal driving and the operation data at the time of diagnosing, and extract a portion meeting a condition previously specified as an index of an abnormally state in the measured waveform as a characteristic point.

4. The abnormality diagnostic device according to claim 3, wherein the abnormal-time characteristic point storage mechanism is to store the characteristic point extracted from operation data measured at the time of actually occurring abnormality in each machine element.

5. The abnormality diagnostic device according to claim 2, wherein the abnormal-time characteristic point storage mechanism is to store the characteristic point extracted from operation data measured at the time of actually occurring abnormality in each machine element.

* * * * *